US008808844B2

(12) United States Patent  (10) Patent No.: US 8,808,844 B2
Niederst et al.  (45) Date of Patent: Aug. 19, 2014

(54) PACKAGING ARTICLES AND LAMINATION FILMS

(75) Inventors: Jeffrey Niederst, Leechburg, PA (US); David M. Riddle, Valencia, PA (US); Grant Schutte, Pittsburgh, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 246 days.

(21) Appl. No.: 13/115,176

(22) Filed: May 25, 2011

(65) Prior Publication Data

US 2011/0220645 A1    Sep. 15, 2011

Related U.S. Application Data

(63) Continuation-in-part of application No. PCT/US2009/065045, filed on Nov. 19, 2009.

(60) Provisional application No. 61/117,778, filed on Nov. 25, 2008.

(51) Int. Cl.
*B32B 15/09* (2006.01)
*B32B 27/08* (2006.01)
*B32B 27/20* (2006.01)
*B32B 15/08* (2006.01)
*B32B 27/18* (2006.01)
*B32B 27/36* (2006.01)

(52) U.S. Cl.
CPC .............. *B32B 15/08* (2013.01); *B32B 27/20* (2013.01); *B32B 27/18* (2013.01); *B32B 27/36* (2013.01)
USPC ............ 428/213; 428/328; 428/458; 428/480

(58) Field of Classification Search
None
See application file for complete search history.

(56) References Cited

U.S. PATENT DOCUMENTS

| 3,287,202 | A |   | 11/1966 | Petriello |
| 3,709,439 | A | * | 1/1973  | Tundermann et al. .......... 241/15 |
| 4,248,917 | A |   | 2/1981  | Hornibrook et al. |
| 4,362,775 | A |   | 12/1982 | Yabe et al. |
| 4,576,997 | A | * | 3/1986  | Trotter et al. ................. 525/444 |
| 4,734,303 | A |   | 3/1988  | Fujiwara et al. |
| 4,945,008 | A |   | 7/1990  | Heyes et al. |
| 4,957,820 | A |   | 9/1990  | Heyes et al. |
| 4,980,210 | A |   | 12/1990 | Heyes |
| 5,059,460 | A |   | 10/1991 | Heyes et al. |
| 5,079,052 | A |   | 1/1992  | Heyes et al. |
| 5,093,028 | A |   | 3/1992  | Kyogoku et al. |
| 5,137,762 | A |   | 8/1992  | Aizawa et al. |
| 5,149,389 | A |   | 9/1992  | Heyes et al. |
| 5,407,702 | A |   | 4/1995  | Smith et al. |
| 5,700,529 | A |   | 12/1997 | Kobayashi et al. |
| 5,759,651 | A |   | 6/1998  | Machii et al. |
| 5,942,285 | A |   | 8/1999  | Schmid et al. |
| 5,976,652 | A |   | 11/1999 | Krause et al. |
| 6,099,924 | A |   | 8/2000  | Nakamaki et al. |
| 6,153,264 | A |   | 11/2000 | Schmid et al. |
| 6,203,915 | B1 |  | 3/2001  | Prissok et al. |
| 6,506,463 | B1 | * | 1/2003  | Cahill et al. ................. 428/35.7 |
| 6,551,662 | B1 |  | 4/2003  | Schmid et al. |
| 6,720,065 | B1 |  | 4/2004  | Cosentino |
| 7,101,590 | B2 |  | 9/2006  | Schmid et al. |
| 8,192,676 | B2 |  | 6/2012  | Share et al. |
| 2005/0227097 | A1 | | 10/2005 | Kawai |
| 2006/0210817 | A1 | * | 9/2006 | Yamanaka et al. ............ 428/458 |

FOREIGN PATENT DOCUMENTS

| EP | 0823325 A2     | 2/1998  |
| JP | H04-327149     | 11/1992 |
| JP | H04-327149 A   | 11/1992 |
| JP | 11091031 A     | 4/1999  |
| JP | 2000-345013    | 12/2000 |
| JP | 2000-345013 A  | 12/2000 |
| WO | 2005083003 A2  | 9/2005  |
| WO | WO2005/083003  | 9/2005  |
| WO | 2008080941 A1  | 7/2008  |

OTHER PUBLICATIONS

International Search Report and Written Opinion for corresponding International Application No. PCT/US2009/065045 mailed on Jun. 14, 2010 (22 pages).
Product Data Sheet for Silvet® 220-2-E Aluminum Pigment by Siblerline Manufacturing Co., Inc. in Tamaqua, PA (1 page).
Database WPI Week 199924 Thomas Scientific, London, GB; AN 1999-282337 XP002570232 & JP 11 091031 A (Ueno H) Apr. 6, 1999.
English-Language translation of Examiner's Report for Japanese Patent Application No. 2011-537594. (3 pages).

* cited by examiner

*Primary Examiner* — Ramsey Zacharia

(57) ABSTRACT

The present application relates to films and packaging articles having films bonded thereto. Also provided are methods of making and applying multilayered films. Exemplary polymeric films include a first layer adjacent the metal sheet having one or more polyester materials and a plurality of metal flakes disposed therein, and a second layer having a majority by weight of one or more crystallizable polyester-based polymers. Other exemplary films include a first layer adjacent the metal sheet having one or more amorphous polyester materials, and a second layer having a majority by weight of one or more crystallizable polyester-based polymers and an opacifying amount of titanium dioxide filler. Yet other exemplary films comprise an oxygen-scavenging material and include a first layer adjacent the metal sheet having one or more amorphous polyester materials, and a second layer having a majority by weight of one or more crystallizable polyester-based polymers.

32 Claims, No Drawings

PACKAGING ARTICLES AND LAMINATION FILMS

CROSS-REFERENCE TO RELATED APPLICATION

This application is a continuation-in-part of International Application No. PCT/US2009/065045 (published as WO 2010/065316) filed on Nov. 19, 2009 and entitled PACKAGING ARTICLES AND LAMINATION FILMS, which claims the benefit of U.S. Provisional Application No. 61/117,778 filed on Nov. 25, 2008 and entitled PACKAGING ARTICLES AND LAMINATION FILMS, each of which is incorporated herein by reference in its entirety.

TECHNICAL FIELD

This invention relates to lamination films and packaging articles (e.g., metal cans and closures) incorporating the lamination films.

BACKGROUND

It is well known that an aqueous solution can corrode an untreated metal. Therefore, metal articles, such as metal containers for water-based products, must be rendered corrosion resistant in order to retard or eliminate interactions between the water-based product and the metal article. Generally, corrosion resistance is imparted to the metal article, or to a metal substrate in general, by passivating the metal substrate, or by coating the metal substrate with a corrosion-inhibiting coating.

Investigators have sought improved coating compositions that reduce or eliminate corrosion of a metal article and that do not adversely affect an aqueous product packaged in the metal article. For example, investigators have sought to improve the imperviousness of the coating in order to prevent corrosion-causing ions, oxygen molecules, and water molecules from contacting and interacting with a metal substrate. Imperviousness can be improved by providing a thicker, more flexible, and more adhesive coating, but often, improving one advantageous property is achieved at the expense of a second advantageous property.

In addition, practical considerations limit the thickness, adhesive properties and flexibility of a coating applied to a metal substrate. For example, thick coatings are expensive, require a longer cure time, can be esthetically unpleasing, and can adversely affect the process of stamping and molding the coated metal substrate into a useful metal article. Similarly, the coating should be sufficiently flexible such that the continuity of the coating is not destroyed during stamping and molding of the metal substrate into the desired shape of the metal article.

Investigators also have sought coatings that possess chemical resistance in addition to corrosion inhibition. A useful coating for the interior of a metal container must be able to withstand the solvating properties of a product packaged in the metal container. If the coating does not possess sufficient chemical resistance, components of the coating can be extracted into the packaged product and adversely affect the product. Even small amounts of extracted coating components can adversely affect sensitive products, such as beer, by imparting an off-taste to the product.

Conventionally, organic solvent-based coating compositions were used to provide cured coatings having excellent chemical resistance. Such solvent-based compositions include ingredients that are inherently water insoluble, and thereby effectively resist the solvating properties of water-based products packaged in the metal container. However, because of perceived environmental and toxicological concerns, and in order to comply with increasingly strict governmental regulations, an increasing number of coating compositions are water-based. Unfortunately, many water-based coating compositions include ingredients that are water-soluble or water dispersible, and, therefore, cured coatings resulting from water-based coating compositions often are more susceptible to the solvating properties of water. In addition, water-based coating compositions do not completely overcome the perceived environmental and toxicological problems associated with organic solvents because water-based compositions often contain some organic solvent.

Therefore, in order to entirely avoid the perceived environmental and toxicological problems associated with organic solvents, investigators have sought solid coating compositions that can be applied to a metal substrate. To date, investigators have had difficulty in providing a solid coating composition that compares favorably to a liquid coating composition with respect to film uniformity, film appearance, and film performance.

In prior attempts to find a useful solid coating composition, investigators have tested powder coatings, laminated film coatings, radiation cure coatings, and extrusion coatings. Attempts have been made to use free film laminates of polymers such as polyethylene terephthalate (PET), polypropylene (PP), and polyethylene (PE). In this method, a preformed polymer film, about 10 to about 25 microns thick, is applied to the metal substrate. The film laminate method is a rapid method of coating a metal substrate, but the method is generally either too expensive and/or the coated metal substrate does not possess all of the required properties. Solid powder coatings also have been used to coat a metal substrate with a coating composition. However, the application of a thin, uniform coating to a metal substrate is difficult using the powder coating method. Solid coating compositions also have been extruded onto a metal substrate. These attempts have encountered serious technical or economical problems.

Investigators, therefore, have long sought a solid coating composition for use on the exterior and interior of food and beverage containers that exhibits the advantageous properties of adhesion, flexibility, chemical resistance, and corrosion inhibition, and that is economical and does not adversely affect the taste or other esthetic properties of sensitive foods and beverages packaged in the container. Investigators especially have sought useful solid coating compositions in order to reduce the perceived environmental and toxicological concerns associated with organic solvents. In particular, investigators have sought a solid coating composition for food and beverage containers that meets increasingly strict environmental regulations, has corrosion inhibition properties comparable to existing organic solvent-based coating compositions, and is easily applied onto a metal substrate as a thin, uniform film. Such a coating composition would satisfy a long felt need in the art.

For convenience, the following description will be mainly directed to metal packaging articles but it will be understood by those skilled in the art that other articles (e.g., caps and closures) may be fabricated using the films and methods of the invention.

SUMMARY

The present invention provides films and articles having films bonded thereto. Also provided are methods of making multilayered films and articles. The materials and methods of the present invention are particularly useful in coating surfaces of packaging articles, including surfaces of metal food or beverage containers, or portions thereof (e.g. closures, easy open can ends, etc.).

In one embodiment, the article comprises a metal sheet, and a biaxially oriented polymeric film heat-bonded to at least one major surface of the metal sheet. The polymeric film preferably includes a first layer adjacent the metal sheet having one or more polyester materials and a plurality of metal flakes disposed therein, and a second layer having a majority by weight of one or more crystallizable polyester-based polymers. The plurality of metal flakes may be present in the second layer and/or another layer, if present, irrespective of whether the first layer includes any metal flakes.

In yet another alternative embodiment, the article comprises a metal sheet, and a biaxially oriented polymeric film heat-bonded to at least one major surface of the metal sheet. The polymeric film preferably includes a first layer adjacent the metal sheet having one or more polyester materials and a second layer having a majority by weight of one or more crystallizable polyester-based polymers and a plurality of metal flakes disposed therein. More preferably, the first layer includes one or more amorphous polyester resins. In yet another alternative embodiment, the article comprises a metal sheet, and a biaxially oriented polymeric film heat-bonded to at least one major surface of the metal sheet. The polymeric film preferably includes a first layer adjacent the metal sheet having one or more amorphous polyester materials, and a second layer having a majority by weight of one or more crystallizable polyester-based polymers and an opacifying amount of a titanium dioxide filler.

In yet another alternative embodiment, the article comprises a metal sheet, and a biaxially oriented polymeric film heat-bonded to at least one major surface of the metal sheet. The polymeric film includes a first layer adjacent the metal sheet having one or more amorphous polyester materials, and a second layer having a majority by weight of one or more crystallizable polyester-based polymers. The polymeric film further comprises an oxygen-scavenging material.

The aforementioned films preferably have a thickness of the first layer in the range of about 5 to about 40% of the overall film thickness, a thickness of the second layer in the range of about 20 to 95% of the overall film thickness, and a thickness of any optional other layers, if present, is up to about 40% of the film overall thickness.

In one embodiment, the film is made by providing a first layer composition disclosed herein (which preferably includes one or more amorphous polyester-based polymers); providing a second layer composition disclosed herein (which preferably includes a majority by weight of one or more crystallizable polyester-based polymers); extruding and casting the first and the second layer compositions to form a film; and then biaxially stretching the cast film to form a multi-layered biaxially oriented film.

In yet another embodiment, the film is made by providing a first layer composition including one or more polyester materials and a plurality of metal flakes disposed therein; providing a second layer composition including a majority by weight of one or more crystallizable polyester-based polymers; extruding and casting the first and the second layer compositions to form a film; and then biaxially stretching the cast film to form a multi-layered biaxially oriented film. In other embodiments, the plurality of metal flakes may be present in the second layer and/or another layer, if present, irrespective of whether the first layer includes any metal flakes. Any of the other film constructs disclosed herein may also be produced using the aforementioned method.

In yet another embodiment, the invention provides a method of attaching the film to a metal sheet. Exemplary methods include heating the metal sheet to a temperature of at least the sticking temperature of the first layer, laminating under pressure the film to the metal sheet, and quenching the film-heat-bonded metal sheet to a temperature at least 30° C. lower than the sticking temperature of the first layer.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF THE PREFERRED EMBODIMENTS

In one aspect the present invention provides an article, comprising: a metal sheet, and a biaxially oriented polymeric film heat-bonded to at least one major surface of the metal sheet. Preferably the polymeric film comprises: a first layer adjacent the metal sheet comprising one or more polyester materials, and a second layer (sometimes called the "core" layer) comprising a majority by weight of one or more crystallizable polyester-based polymers (e.g., polyester terephthalate ("PET")). In one embodiment, the first layer includes a plurality of metal flakes disposed therein. Alternatively, the plurality of metal flakes may be present in both the first and second layers, in the second layer alone, in a layer other than the first or second layer, or may be omitted altogether.

The polymeric film may optionally comprise other layers or be treated with other coatings. In one embodiment, the film's free surface provides or is modified so as to provide low friction or low surface energy. In another embodiment the film's free surface provides or is modified so as to provide sufficient adhesion to a subsequently applied material. Other optional layers, including layers between the first and second layers, top coats, etc., may be utilized.

In embodiments where the free surface of the polymeric film requires low friction or low surface energy, the film preferably has either had a liquid wax coating applied thereto or comprises a third surface layer that includes a polymeric film (e.g., a polyester film) having one or more wax materials blended therein. The optional liquid wax coating and/or optional third surface layer provides one or more of low adhesion to materials placed adjacent the film (e.g., low adhesion to food products) and/or low friction, which facilitates stamping operations that are performed on the coated substrate.

Alternatively, in another embodiment the polymeric film is used on a container closure. In this embodiment the film is in intimate contact on one side by the metal closure and on the other side by a gasket material. Preferably, the film has good adhesion to both the metal closure substrate and to the gasket material and comprises: a first layer adjacent the metal sheet comprising one or more polyester materials and optionally a plurality of metal flakes disposed therein, a second layer comprising a majority of PET, and a third layer comprising one or more polyester materials and optionally a plurality of metal flakes disposed therein. Optionally, the metal flakes may be disposed in the second layer irrespective of whether metal flakes are present in the first layer and/or the third layer.

Suitable films for use in the present invention have a suitable glass transition temperature and melting point to permit excellent formability of the film-heat-bonded metal sheet and adaptability to retort treatment and corrosion resistance of the resulting container. Preferred films used as a protective coating film preferably possess a glass transition temperature of at least 55° C. and a melting point of at least 220° C. The films more preferably are formed using polyester-based materials.

Suitable biaxially oriented film may be prepared, for example, by stretching a cast polyester film to 2.5 to 5 times its original length in the longitudinal direction and to 2.5 to 5 times its original width in the transverse direction at a temperature higher than the glass transition temperature but lower than the crystallization temperature, and then, heat-setting the stretched film at a temperature of 150 to 250° C. More particularly, a biaxially oriented polyester film, which has been stretched about 3.75 times its original length in the longitudinal direction and about 3.75 times its original width in the transverse direction and, then, heat-set at a temperature of 220 to 240° C. under tension, is optimum in view of its ability to be laminated to a metal sheet and subsequent formability.

The "first layer" of the biaxially oriented film is defined as the layer of the film that is in direct contact with the metal substrate. This layer may be alternatively referred to as the "contact layer," "bonding layer," "adhesion layer," or "adhesive layer."

The first layer may be comprised of a single polymer or blends of suitable polymers. Suitable polyesters for use in the adhesive layer include polyesters formed from one or more suitable dicarboxylic acid components and one or more suitable diol components.

Preferred polyesters for use in the adhesive layer have an intrinsic viscosity of at least about 0.4, more preferably between 0.5 and 1.2, and most preferably between 0.55 and 0.82.

Suitable dicarboxylic acid components include, for example, aromatic dicarboxylic acids such as terephthalic acid, isophthalic acid, phthalic acid and naphthalenedicarboxylic acid; aliphatic dicarboxylic acids such as adipic acid, sebacic acid and azelaic acid; and combinations thereof.

Suitable diol components include, for example, polymethylene glycols represented by the formula HO—$(CH_2)_n$—OH (where n is about 2 to 10) such as ethylene glycol, propylene glycol, butanediol, hexanediol and decamethylene glycol; branched glycols represented by the formula HO—$CH_2$—C($R_2$)—$CH_2$—OH (where R is an alkyl group having 1 to 4 carbon atoms) such as neopentyl glycol; 2-methyl-1,3-propanediol; diethylene glycol and triethylene glycol; diols having a cyclohexane ring such as cyclohexane dimethanol (CHDM); and combinations thereof.

Preferably the adhesive layer comprises a mixture of crystalline polyesters and amorphous polyesters. More preferably, the composition of the first layer preferably contains at least one "amorphous" polyester resin, which is preferably present within the first layer at a level of 25 to 100 weight percent ("wt. %"), based on the weight of all the ingredients in the first layer. Even more preferably, the amorphous polyester should be present at a level of about 40 to 90 wt. %, and most preferably between 50 to 80 wt. %. In this context, "amorphous" is meant to describe a polyester resin that is not under normal use conditions substantially crystallizable and does not display significant $T_m$ (melting point) transitions when tested using Differential Scanning calorimetry ("DSC"). (The melting point of polyesters (and blends of such polymers) may be determined by using DSC as described in U.S. Pat. No. 4,362,775, which is herein incorporated by reference.) When the concentration of the amorphous polyester resin within the first layer is less than 100%, the remainder of the first layer can be comprised of other crystallizable polyester resins, such as those contained within the "core layer."

Suitable amorphous polyester resins include "PET-like" copolyesters based on esters of terephthalic acid. More specifically, the terephthalic acid is esterified and polymerized with diol components such as were earlier described. More preferably, the terephthalic acid is reacted with at least a portion of a diol that reduces the ability of the final polymer to be crystallizable. More specifically, the diol component can be comprised of a blend of two different diols such as ethylene glycol and a diol which is known to reduce the crystallizability of terephthalic acid based polyesters. Such a representative diol is cyclohexane dimethanol (CHDM). While not intended to be bound by theory, the CHDM (or other suitable such diol) is preferably present at a level that serves to disrupt the crystallizability of the terephthalic acid/ethylene glycol component, thereby rendering the final polymer substantially amorphous. Such materials are commonly referred to as "PET-G" or "PETG." In preferred embodiments, the CHDM is present at a level of from 5 to 75% of the total moles of the diol blend, more preferably from 10 to 60%, and most preferably from 20 to 40% of the total moles of the diol blend. An example of a suitable, commercially available polymer of this type is EASTAR 6763 which is copolyester resin supplied by the Eastman Chemical Company. This resin is believed to have 30-mole % CHDM and 70-mole % ethylene glycol ("EG"), based on the total moles of the diol blend.

Other typical polyesters which may be used as ingredients in the adhesive layer include PET, a copolyester of ethylene terephthalate/ethylene isophthalate (hereinafter abbreviated as "PET/I"), PBT, a copolyester of butylene terephthalate/ethylene isophthalate (hereinafter abbreviated as "PBT/I"), a copolyester of ethylene terephthalate/ethylene adipate (hereinafter abbreviated as "PET/A", a copolyester of ethylene terephthalate/ethylene sebacate (hereinafter abbreviated as "PET/S") and a copolyester of ethylene terephthalate/neopentyl terephthalate. Of these polyesters, PET, PBT, PET/I, and PBT/I are preferable.

For example, in one preferred embodiment, the adhesive layer comprises 67 parts by weight PET-G, 30 parts crystalline PET, 3 parts PET-I, and 2 parts metal flakes (as discussed below). In another preferred embodiment, the adhesive layer comprises 67 parts by weight PET-G and 33 parts crystalline PET and does not include PET-I or metal flake.

It was a surprising discovery that the presence of the amorphous copolyester resin within the first layer is very important to the performance of the film. It has been found that the amorphous polymers provide greater adhesion than comparable crystallizable polymers when laminating to substrate such as the steel or aluminum. This increased bonding strength gives rise to laminate structures that can adequately be applied and bonded to commercially available substrates using commercially available equipment.

When the level of amorphous polyester resin within the first layer is less than about 25%, it has been found that the resulting laminate structure shows reduced adhesion strength and cannot typically adequately be applied using commercially available equipment.

A second surprising benefit of the amorphous polyester is its resistance to crystallization during post heating. Many coated articles used in the food packaging industry undergo a post-heating step such as pasteurization or retort whereby the article is exposed to steam or water in the temperature range of 50-130° C. During this post heating, crystallizable polyesters will tend to display some level of crystallization which can lead to discoloration, cracking, crazing or reduction in adhesion. Any of these defects will reduce the overall quality of the laminate and can cause the article to be rejected by a consumer.

There is also a surprising complimentary improvement in the adhesion performance of the film due to low shrinkage of the film during the heat lamination process which is believed to be attributable to the inclusion of a suitable amount of crystallizable resin into the first layer, the first layer's orientated structure imparted by the biaxial orientation film making process, and the subsequent annealing process. There is a further surprising improvement in the fabrication and corrosion performance of the coated article by the inclusion of a suitable amount of crystallizable polyester in the first layer.

In addition to the polyester polymers, the first layer composition may also contain various optional additives that can serve to further enhance the overall performance of the laminate structure. For example, these additives can be used to enhance the adhesion, corrosion resistance or product resistance of the laminate structure. Such additives may also be included in the other layer(s) of the film.

Suitable optional additives are typically included at a level of 0 to 25 wt. % of the overall layer composition, 0 to 10 wt. % of the overall layer composition, more preferably 1 to 10 wt. %, even more preferable 1 to 5 wt. %, and most preferably 1.5 to 2.5 wt. %.

Suitable optional additives include inorganic materials such as salt compounds, complexes of metallic elements such as titanium, aluminum, iron, manganese, magnesium, cobalt and the like as well as processed materials such as clays, micas, microspheres and the like. Other optional additives include organic materials such as dispersed polymer particles or domains. One presently preferred optional additive is a dispersion of a metal (e.g., an aluminum pigment). More preferably, the first layer contains an additive comprised of aluminum metal flakes. Most preferably the additive is a dispersion of aluminum metal flakes in a non-volatile carrier such as a surfactant, wax, polymer or other suitable carrier resin.

A second presently preferred optional additive is a dispersion of a non-polyester polymer that preferably is present as discreet domains within the polyester continuous phase of a film layer. More preferably, the additive is a nylon polymer preferably present as domains having an average diameter of about 0.1 to about 1 micron, measured by means of a formic acid etch and Scanning Electron Microscope method known to the industry. Most preferably, the additive is a pre-dispersion of nylon polymer particles in a polyester carrier that also includes an inorganic salt such as cobalt neodecanoate.

A "metal flake" as used herein is a metal particle having a generally flattened shape as opposed to a spherical shape. Suitable flake particles have an average aspect ratio (diameter:height) in the range of about 1.5:1 to about 100:1. In the case of irregular flakes, the "diameter" is the calculated diameter of a circle having the area of the irregular shape, and the height is the average height of the flake. The average aspect ratio is more preferably about 20:1 to about 80:1, and is most preferably about 40:1 to 60:1. The flakes preferably have an average diameter in the range of about 0.1 microns to about 20 microns, and more preferably about 1 to 15 microns. The flakes preferably have an average height in the range of about 3 microns to about 12 microns, preferably about 6 to 12 microns.

Representative dispersed metal flakes can be commercially obtained from Silberline. Silberline supplies aluminum pigment flakes in a variety of non-volatile carriers, which are believed to be polyolefin carriers.

In addition, both "leafing" and "non-leafing" aluminum flakes may be used. Of most interest, are the grades of pre-dispersed aluminum sold under Silberline's SILVET trade name. These aluminum dispersions are provided in a polymeric carrier. A most preferred aluminum dispersion is the Silberline SILVET 220-20E which is comprised of 80 wt. % of a leafing aluminum pigment and 20 wt. % of an extrusion grade polyolefin polymer, which is believed to be a polyethylene resin.

While not intending to be bound by theory, it is believed that the presence of the aluminum pigment enhances the performance of the laminate structure by forming a protective barrier layer of aluminum pigment "leaves" which presents a tortuous pathway by which reagents must pass through to interact with the surface. It is believed that this will slow the overall passage of the reagents, thereby making the laminate structure more resistant to attack. Although it is contemplated that the metal flakes may be located in any desired layer of the film, the first and second layers are preferred layers for the metal flakes.

In certain preferred embodiments, the second layer (and/or another layer, if present, such as a third layer) contains metal flakes irrespective of whether the first layer includes any such metal flakes. One such preferred alternative embodiment includes:

a first layer preferably having at least 25 wt. % and more preferably a majority by weight of amorphous polyester-based polymers (e.g., PET-G), a second layer having a majority by weight of one or more crystallizable polyester-based polymers (e.g., crystalline PET) and a plurality of metal flakes, and one or more optional additional layers, if any.

The biaxially oriented film generally also includes a second layer, which is herein sometimes referred to as the "core layer."

Preferably the core layer comprises a mixture of one or more crystalline polyesters. In some embodiments the core layer may further comprise one or more optional amorphous polyesters. More preferably, the composition of the first layer preferably contains a majority of crystalline polyester resin, which is more preferably present within the core layer at a level of 50 to 100 wt. %, most preferably at a level of 70 to 100 wt. % based on the weight of all the ingredients in the core layer. In this context, "crystalline" or "crystallizable" is meant to describe a polyester resin that is under normal use conditions substantially crystallizable and displays significant $T_m$, transitions when tested using DSC. When the concentration of the crystalline polyester resin within the core layer is less than 100%, the remainder of the core layer can be comprised of other polymers (e.g., amorphous polyester resins, such as those contained within the "first layer") or other fillers.

Suitable polymers used for the preparation of the core layer of the film include, for example, polyester-based polymers, such as PET, PBT, polyethylene-2,6-naphthalate and poly-1,4-cyclohexylenedimethylene terephthalate. Of these PET is most preferable. It is anticipated that the core layer may also contain some PETG, IPA (Isophthalic acid) modified PET or other low crystallizing polymer for applications that require post heating (e.g., use of a thermal varnish). Copolyesters predominantly comprised of ethylene terephthalate units are also preferable. These copolyesters (in the case of inside packaging coatings where product resistance is paramount) may contain a minor proportion, preferably not larger than 5% by mole of dicarboxylic acid components other than terephthalic acid, such as isophthalic acid, sebacic acid and adipic acid. The copolyesters may also contain a minor proportion, preferably not larger than 5% by mole, of diol components other than ethylene glycol, such as butanediol, diethylene glycol, triethylene glycol and 1,4-cyclohexanedimethanol. For interior packaging applications where product resistance is important, the amount of crystalline polymer used in the core layer can generally be increased, and the amount of amorphous polymer is minimized. In contrast, the amount of amorphous polymer used in the core layer can be increased for exterior applications where product resistance is not as important.

If desired, the core layer may comprise recycled materials. Suitable recycled materials include post consumer PET prepared from PET plastic containers and other recyclables that are returned by consumers for a recycling operation. The FDA has now approved post consumer PET for use in certain food containers. Post consumer PET is known to have a certain level of intrinsic viscosity (I.V.), moisture level, and contaminants. For example, typical post consumer PET (having a flake size of one-half inch maximum), has an I.V. average of about 0.66 dl/g, a moisture content of less than 0.25%, and the following levels of contaminants: PVC: <100 ppm; aluminum: <50 ppm; olefin polymers (HDPE, LDPE, PP): <500 ppm; paper and labels: <250 ppm; colored PET: <2000 ppm; other contaminants: <500 ppm.

Preferred core layer polymers have an I.V. of between 0.4 and 1.2 dl/g, more preferably between 0.55 and 1.0, and most preferably between 0.55 and 0.82.

In situations where the free surface of the polymeric film requires low friction or low surface energy, the film preferably has either had a liquid wax coating applied thereto or comprises a third surface layer that comprises a polymeric film (preferably a polyester film) having one or more wax materials blended therein. The optional liquid wax coating and/or optional third surface layer preferably provide one or more of low adhesion to materials placed adjacent the film (e.g., low adhesion to food products) and/or low friction coefficient, which facilitate stamping operations that are performed on the coated substrate.

In situations where the film has a liquid wax coating applied thereto, the wax coating preferably comprises an aqueous dispersion of a suitable wax. Suitable wax materials include aqueous dispersions, emulsions or "wax rich coatings." Such wax materials include aqueous, solvent borne or neat materials containing natural waxes such as carnauba, candelilla, lanolin, lanocerin, or mixtures thereof. Preferred third layer blends comprise up to about 10% by weight wax, more preferably 0.1 to 5% wax, and most preferably 0.5 to 2% wax.

In situations where the film comprises a third surface layer that comprises a polyester film having one or more wax materials blended therein, the third surface layer preferably comprises a blend of a compatible polymer or polymers (e.g., a polyester polymer is suitable for use atop a polyester-based core layer) and an effective amount of a wax material. Suitable polyester materials for use in this layer include the aforementioned materials used in the first and second layers and the third layer may comprise either or both of crystalline and amorphous polyesters. In one embodiment, the third layer comprises 30 parts by weight PET-G; 70 parts by weight crystalline PET; and 1 part by weight carnauba wax.

Alternatively, in another embodiment the polymeric film is used on a container closure. In this embodiment the film is in intimate contact on one side by the metal closure and on the other side by a gasket material. Preferably, the film has good adhesion to both the metal closure substrate and to the gasket material and comprises: a first layer as described above and herein, a core layer as described above and herein, and a third layer comprising a polymer adapted for use with the selected gasket material. Such polymers include PET-G, nitrile rubbers, polyolefins, and acrylonitrile-based acrylic polymers. In one preferred embodiment, the third layer is made of the same type of material as the adhesive layer.

If desired, one or more of the layers of the biaxially oriented polyester film may have incorporated therein suitable amounts of optional additives such as antioxidants, gloss modifiers, hardness modifiers, thermal stabilizers, abrasion resistance modifiers, additives to better "accept" printing inks, viscosity modifiers, plasticizers, adhesion enhancing agents, nucleating agents, finely divided inorganic particles and metal powders, organic lubricants, pigments and dyes.

One preferred additive is titanium dioxide. By the incorporation of up to 40% by weight, preferably 15 to 25% by weight of titanium dioxide, a white colored film is obtained that has good esthetic properties. The titanium dioxide may be added to either the core layer or the adhesive layer or both layers. More preferably the titanium dioxide is added to the core layer.

The various layers may also have incorporated therein one or more polymers for imparting to the respective layer, for example, a plasticizing effect or adhesion enhancing effect. The amount of the polymers to be incorporated may be suitably determined, provided that the objects of the invention are not substantially influenced.

The core layer may be in direct contact with the adhesive layer. Alternatively, one or more other layers (e.g., a layer of an adhesion-enhancing material, an anchor coat layer, an electrical discharge-treated layer, an oxygen-scavenging material, etc.) may be interposed there between. The various layers (i.e., at least one of the core layer, the adhesive layer or the optional other layers) may also have incorporated therein one or more materials for imparting to the respective layer an oxygen-scavenging property.

In one embodiment, the structure of the film is modified to provide the laminated film with the ability to absorb/scavenge oxygen. The ability of the film to scavenge oxygen could be of particular benefit when the polyester film structure/laminate is used as a coating for the interior of a packaging container that contains food or beverage products. The removal of oxygen from the package could prolong the freshness of the packaged product, preserve the color of the packaged product, or even enhance the corrosion resistance of the coated can. Preferably, at least one layer of the structure has at least some amount of an oxygen-scavenging material, more typically an oligomer or polymer capable of scavenging oxygen in combination with a catalyst for promoting oxygen scavenging. Examples of suitable oxygen-scavenging polymers include oxygen-scavenging polyamides (e.g., poly(m-xylylene adipamide)), oxygen-scavenging polyesters, oxygen-scavenging polyolefins (e.g., polybutadiene or copolymers of polyester and polybutadiene), and copolymers thereof. Suitable oxygen-scavenging groups for inclusion in such oxygen-scavenging materials include groups having aliphatic or cycloaliphatic carbon-carbon double bonds (e.g., unsaturated bicyclic groups such as norbornene-containing groups, butadiene- or polybutadiene-containing groups, unsaturated fatty acid containing groups, etc.), metaxylene diamine containing groups, etc. Suitable oxygen-scavenging materials are disclosed in U.S. Pat. Nos. 6,933,055, 7,244,484, and 7,479,326; U.S. Pub. Nos. 2009/0311457, 2010/0237283, and 2010/024782; International Pub. Nos. WO2008/124682 A2 and WO2009/029479 A1; and International Application Serial No. PCT/US08/79618 (now published as International Pub. No. WO2010/042125). Oxygen-scavenging polyamides are presently preferred, with polyamides having units formed from m-xylenediamine being particularly preferred (e.g., a polyamide formed from reactants including m-xylylenediamine and a polycarboxylic acid such as adipic acid). Examples of suitable commercially available oxygen-scavenging polyamides include the MXD6 line of polyamides from Mitsubishi.

For example, an optional oxygen-scavenging layer may comprise a suitable polymer (e.g., a polyester polymer) together with an oxygen-scavenging composition. One suitable material is ValOR Activ100, which is marketed by The Valspar Corporation and includes a mixture of PET, a polyamide oxygen-scavenging polymer, and a catalyst. A suitable film could contain efficacious amounts of the ValOR Activ100 in the core layer of the film. More specifically the ValOR Activ100 is present in the film from 0 to 50 wt. %, more specifically 5 to 40 wt. % and most preferably 10 to 30 wt. %.

The amount of optional oxygen-scavenging polymer included in a given layer will vary depending on a variety of considerations such as cost, compatibility (e.g., with other materials present in a given layer and/or materials of adjacent layer(s)), oxygen-scavenging efficacy, aesthetics, and the desired end use. Typically, an oxygen-scavenging layer will include at least about 1 wt. % of oxygen-scavenging polymer, more typically at least about 2 wt. % of oxygen-scavenging polymer, and in some embodiments about 5 wt-% or more of such materials. The amount of oxygen-scavenging polymer in a layer will typically not exceed about 20 to 25 wt. %.

Suitable catalysts and catalyst concentrations for promoting efficient oxygen scavenging are provided below in conjunction with the feathering discussion. The catalyst typically includes a transition metal, with cobalt-containing catalysts being preferred.

It is contemplated that one or more metal catalysts may be present in a different layer than the oxygen-scavenging oligomer or polymer such as in adjacent layers, although the materials are preferably present in a same layer to enhance the efficiency of their interaction. In a preferred oxygen-scavenging embodiment, the catalyst and oxygen-scavenging polymer are both present in the second layer.

In some embodiments, the structure of the film is modified to provide a laminated film having excellent feathering properties. An absence of coating feathering is desired in certain end uses such as, for example, easy-open can ends for food or beverage cans. The production of such can ends typically includes pre-scoring of the metal substrate, which subsequently allows for the opening of the can end using a pull tab attached to a rivet of the can end to enable consumption of the packaged food or beverage product. The use of this scoring technique requires that both the substrate and the applied coating tear easily and cleanly. The absence of clean tearing is often referred to as "feathering" (or alternatively, frilling, haring, or haloing) due to the presence of unsuitable amounts of residual coating across the opening of the can. It is generally undesirable for the interior coating to display appreciable feathering, as it can be esthetically unpleasing to consumers of the packaged food or beverage product. As such it is desirable that coatings used for the interior of easy-open food or beverage can ends do not display appreciable feathering.

In certain embodiments where excellent feathering properties are desired (i.e., the absence of appreciable feathering), the film includes one or more layers having (i) an efficacious amount of one or more polyamide materials and/or (ii) an efficacious amount of one or metal catalysts preferably capable of reducing the molecular weight of polyester materials such as, e.g., PET or copolymers of PET. Thus, for example, the first layer, the second layer, and/or another layer, may include the aforementioned materials (i) and/or (ii).

Suitable such metal catalysts may include, for example, transition metals such as cobalt, iron, nickel, aluminum, ruthenium, rhodium, palladium, antimony, osmium, iridium, platinum, copper, manganese, and zinc, as well as oxides, salts or complexes of these metals, and mixtures thereof. For example, cobalt II salts of short chain acids such as acetic acid or terephthalic acid, or long chain acids such as neodecanoic, stearic, 2-ethyl hexanoic, or octenyl succinic acid may be used. Salts of inorganic acids may also be used. For example, antimony chloride III, antimony chloride V, and cobalt chloride may be used. Preferred metal catalysts include salts of cobalt and long chain acids such as, for example, cobalt acetate, cobalt neodecanoate, cobalt stearate, cobalt octoate, and mixtures thereof. When used, the one or metal catalysts are preferably present in the layer in an amount of at least 5 ppm (by weight metal), more preferably in an amount from about 10 to 1,000 ppm, even more preferably in an amount from about 20 to 500 ppm, and most preferably in an amount from about 50 to 250 ppm. In one embodiment, the second layer includes such an amount of one or more metal catalysts. Care should be exercised in determining an appropriate amount of the one or more metal catalysts because the presence of an excessive amount of metal catalyst can result in an unsuitably low viscosity for the melt used to form the layer.

Suitable polyamide materials may include, for example, polyamides that are a reaction product of ingredients including m-xylylenediamine and a polycarboxylic acid (e.g., adipic acid); nylon 6; nylon 6,6; nylon 6,12; nylon 11; nylon 12; and copolymers or mixtures thereof. Poly(m-xylylene adipamide), otherwise known commercially as MXD6 nylon, is an example of a preferred polyamide material. When used, the one or more polyamide materials are preferably present in the layer in an amount of at least about 3 wt. %, more preferably at least about 5 wt. %, even more preferably from about 5 to 25 wt. %, and even more preferably from about 15 to 20 wt. %. In one embodiment, the second layer includes such an amount of one or more polyamide materials.

It is further contemplated that, to improve feather properties, a suitable amount (e.g., less than about 1,000 ppm, more preferably about 200 to 500 ppm) of one or more protic solvents (e.g., water) may be included in melt blends used to form the layer(s).

An example of a feathering test is described as follows. To test feathering, a "tab" is scored on the backside of a coated metal panel, with the coated side of the panel facing downward. The test piece is then immersed in a deionized water bath for 45 minutes at 85° C. After pasteurization, pliers are used to bend the cut "tab" to a 90-degree angle away from the coated side of the substrate. The test piece is then placed on a flat surface, coated side down. The cut tab is gripped using pliers and the tab is pulled from the test panel at an angle of 180 degrees until it is completely removed. After removing the tab, any coating that extends into the opening on the test panel is measured. The distance of the greatest penetration (feathering) is reported in inches. Coatings for easy-open food or beverage can ends preferably show feathering below 0.2 inches (0.508 cm), more preferably below 0.1 inches (0.254 cm), most preferably below 0.05 inches (0.127 cm), and optimally 0.02 inches or lower (0.051 cm). Certain preferred films of the invention, when suitably cured, exhibited a feathering of 0.02 inches when tested as described above.

The thickness of the core layer, the thickness of the adhesive layer and the proportion of these two thicknesses may be varied depending upon the intended end use. Usually, the total thickness of the biaxially oriented film is in the range of from about 5 to 500 microns. In the case where the container is formed by drawing processing, the total thickness of the two layers is preferably in the range of from about 10 to 100 microns, particularly about 15 to 50 microns in view of the formability. If the film is intended for use in applications where a high corrosion resistance is required, the thickness of the core layer may exceed about 100 microns, but in most applications is in the range of from about 10 to 100 microns, preferably from about 15 to 50 microns. The thickness of the adhesive layer varies mainly depending upon the surface roughness of the metal sheet. However, when the metal sheet is of a relatively smooth surface, the thickness of the adhesive layer may be at least about 2 microns for the desired adhesion, at least about 3 microns for the desired adaptability to retorting treatment, and more preferably at least about 5 microns. Thus, the ratio in thickness of the core layer to the adhesive layer may be in the range of 1/0.05 to about 1/5, preferably from 1/0.1 to 1/3, and more preferably from 1/0.4 to 1/2.5.

In one preferred embodiment, the thickness of the core layer is at least 20% of the overall film thickness, more preferably in the range of about 20 to 80%, most preferably in the range of about 50 to 70%, and optimally about 60%.

In one preferred embodiment, the thickness of the adhesive layer is up to about 40% of the overall film thickness, more preferably in the range of about 5 to 30%, most preferably in the range of about 10 to 25%, and optimally about 20%.

In one preferred embodiment, the thickness of the surface layer, if present, is up to about 40% of the film overall thickness, more preferably in the range of about 5 to 30%, most preferably in the range of about 10 to 25%, and optimally about 20%.

Multi-layer, biaxially oriented films are preferably prepared in a two-stage process. In a typical commercial process these stages are conducted in tandem and are usually performed in a continuous manner. For the sake of clarity, multi-layered films comprised of three layers will be discussed in more detail, though the principles may be utilized to manufacture multi-layer films having 2, 4, 5, or more layers.

The two stages of the film formation process include (1) the production of a multi-layer cast film and (2) subsequently stretching the cast film according to the processes and ratios previously discussed. This is usually accomplished by heating the multi-layer cast film to an appropriate temperature, and then biaxially stretching the film to achieve the desired film length, width and thickness.

For example, if a three-layer cast film were to be comprised of three different materials (one for each distinct layer) it would be typical to use three extruders, i.e., a dedicated extruder for the feeding of each differing material. A multi-layer die, which is capable of receiving and casting the different materials as a multi-layered molten veil, would be utilized. The thicknesses of the various layers of the veil may be controlled by the rate at which each molten material is fed from the extruder to the die. For example if the melt feed rate of the middle layer extruder is twice that of both of the other extruders one would prepare a film whose layer proportions are approximately 25%/50%/25%. The overall thickness of the cast film may be controlled by the overall line speed at which the film is being pulled in conjunction with the total feed rate of molten polymer.

Suitable cast films of the present invention have thicknesses ranging from 5.0-20.0 mils (127 to 508 microns). When combined with an overall stretching process that reduces the film approximately sixteen fold, the resulting biaxially oriented films will have a final thickness in the range of 0.3-1.25 mils (7.62 to 31.75 microns).

Most materials used for extrusion and film formation are supplied and/or produced in pellet or granulate form. These pellets are typically a few millimeters in length. Each of the materials is metered through the back end of the extruder via a hopper. A gravimetric hopper metering system may be used to control the weight/time feed rates of materials. In typical cast film formation, each hopper of each extruder is fed with only one granulate. Therefore a typical three-layer cast film, which uses a different material for each layer, would typically be made from a total of three different pellets. However, as discussed herein, there are situations where a layer is itself comprised of a blend of more than one material. In such situations, there are at least two practical means of achieving the blend.

The first method would be to simply prepare a "cold blend" of the materials (i.e., a simple physical blend of the materials to be mixed) and feeding this cold blend directly to the extruder. When using this approach, one is relying on the extruder to adequately mix and homogenize the cold blend and feed the mixture uniformly to the feeding block of the film die. This method requires an extruder that is able to both meter the materials to the film and uniformly mix the cold blend. Care should be taken when using this approach as many commercial film extruders are not particularly suited for mixing cold blends and usually results in films with very poor homogeneity. A more preferred means of preparing a layer comprised of a blend of more than one material is through "pre-compounding." In this process, the material used in the layer are again cold blended at the appropriate ratio and are fed into the hopper of an extruder used for material mixing, blending or compounding. These machines can contain a variety of screw configurations that are designed to achieve material mixing and dispersion. Suitable mixing extruders can be either single- or twin-screw extruders, and can also be specialty, single-screw extruders such as Buss kneaders. A Buss kneader is essentially a specialty single-screw extruder, which provides an effective mixing of components while minimizing any overworking of the mixture, which could result in degradation. Once the material blend is passed through the compounding extruder, a single, fully mixed pellet is obtained. This single pellet can then be used in the film production, as no further mixing within the film making extruder is required.

The manufacture of a multi-layer film is essentially done at a single temperature. While different temperatures can be used within the separate delivery extruders, the material temperatures become "normalized" to the temperature that is used within the die. The temperature of the die is preferably set to a temperature at which all of the layers flow at similar speeds. If one or more of the layers is flowing at a speed that is significantly different from the others, the film will be non-uniform and may contain defects. "Viscosity matching" can become a concern when using a pre-compounding process. More specifically, the pre-compounding process can cause a reduction in the viscosity of the materials used to make the layer. This change in viscosity can prevent the layer from optimally flowing in the co-extrusion process. Therefore very special care needs to be taken during the "pre-compounding" step to ensure that the blended material's viscosity is within the desired range.

By way of example, an adhesive layer composition was prepared by blending a non-crystallizable, amorphous PET polymer, a crystallizable PET polymer and an aluminum pigment. In this example, EASTAR 6763 PETG, commercially available from the Eastman Chemical Co, was used as the non-crystallizable PET polymer. To prepare this material for compounding, it was vacuum dried at 80° C. for 8 hours to a moisture content of less than 100 ppm, as measured by Karl-Fischer principle. KOSA 1101 PET, commercially available from the Invista Chemical Co, was used as the crystallizable polymer. To prepare this material for compounding, it was vacuum dried at 130° C. for 6 hours to a moisture content of less than 100 ppm, as verified by Karl-Fischer principle. SILVET 220-20E aluminum pigment, commercially available from the Silberline Manufacturing Co, was used as the inorganic pigment. This material was used as supplied.

The two pre-dried PET resins, along with the aluminum pigment, were used to prepare a cold blend consisting of (by weight) 65% EASTAR 6763, 33% KOSA 1101 and 2% aluminum pigment. This cold blend was tumbled for approximately 10 minutes to help facilitate homogeneity of the pellet blend. The pellet blend was then fed into the hopper of a modified single-screw extruder using a Buss kneader screw configuration. The Buss kneader was used to maximize the mixing of the materials and also minimize any shear-induced degradation or loss of melt viscosity. Extruder barrels were set for a nominal temperature of 260° C. Once fed into the extruder, the pellet blend was melt mixed within the extruder for about 1.5 minutes. Once mixed, the blend exited the extruder through a two-hole stranding die, was cooled in a cold water bath, and chipped to form pellets for subsequent testing and film making.

Following compounding, the pellets were again vacuum dried at 100° C. for about 6 hours to a moisture content of less than 100 ppm. The dried pellet blend was tested for melting I.V. using a Dynisco LCR700 Melt Rheometer. The viscosity of the material was tested at 260° C. and was compared to the original EASTAR 6763 and 100% KOSA 1101 materials. In this testing, it was determined that the EASTAR 6763 had a melting I.V. of about 0.75 and the KOSA 1101 had a melting I.V. of 0.81. In comparison, the pellets were determined to have a melting IV of 0.77. The results of this testing indicated that the I.V. (melting viscosity) of the pellet was intact and was not significantly reduced by the compounding process.

A sample of the aforementioned pellet was evaluated for cast film formability. In this testing, the pellets were fed into a hopper of a single-screw extruder that accurately simulates the types of extruders used in commercial film production. The temperature of this extruder was maintained at about 280° C. This single-screw extruder was aligned with a monolayer cast film die, which was also maintained at about 280° C. The pellets were cast into a 10-mil (254 micron) testing cast film. The resulting film was very uniform and homogenous. This homogeneity indicates that the resins and additive were adequately mixed during the compounding process. In addition, the film was free of any bubbles or perforations indicating that the material was adequately dried and did not decompose and produce any off-gassing. These results indicate that a very careful pre-compounding of the material blend results in a high quality film with excellent homogeneity.

Suitable metal sheets for use in the present invention include those that are used as materials for containers, such as iron, aluminum (e.g., untreated "cleaned only" aluminum, chromate treated aluminum and "non-chrome treated aluminums such as Betz 1903), and copper. Suitable steel sheets include, for example, untreated steel sheets (i.e., black plates), tinplates, galvanized steel sheets, electrolytically chromated steel sheets and chemically treated steel sheets such as phosphate-treated steel plates and chromated steel plates. Of these, chemically treated steel sheets and electrolytically chromated steel sheets are the most preferable from considerations of cost and corrosion resistance of the containers. The thickness of the metal sheets may be usually in the range of from 0.01 to 5 mm, more preferably from 0.1 to 0.5 mm.

The polyester film-heat-bonded metal sheets of the invention may be prepared by one of the following methods.

In a first method, a composite film comprised of the core layer and the adhesive layer is prepared and, then, the metal sheet is laminated with the composite film.

In a second method, the core layer and the adhesive layer are separately prepared as films. Thereafter, a pre-heated metal sheet is laminated with the adhesive layer film and, then, with the core layer film.

In a third method, the adhesive layer is extruded onto the metal sheet by means of extrusion lamination and, then, the core layer film is laminated on the adhesive-coated sheet.

Among the above-mentioned three methods, the first method is the most preferable in view of the lamination workability and yield.

The composite film may be prepared by (a) co-extruding the core layer and adhesive layer, and biaxially stretching and then heat-setting the co-extruded film; (b) extruding the adhesive layer onto the non-oriented or uniaxially stretched core layer film by means of extrusion lamination, and then, stretching and then heat-setting the obtained composite film; or (c) extruding the adhesive layer onto the core layer film by means of extrusion lamination.

A typical example of the method for preparing the polymer-film-heat-bonded metal sheet will now be illustrated with reference to a metal sheet having a biaxially oriented polymeric film heat-bonded thereto.

In a first method, a biaxially oriented composite film comprised of the core and adhesive layers is supplied onto a metal sheet, which is maintained at a temperature of at least the sticking temperature of the adhesive layer, usually at a temperature of 80 to 250° C., more preferably 90 to 200° C., and continuously moved. The supplied composite film is preferably pre-bonded to the metal sheet under a pressure of 1 to 100 kg/cm, more preferably 5 to 50 kg/cm. This step is called the "pre-bonding step." Thereafter, the pre-bonded composite film-metal sheet is re-heated to a temperature higher than the pre-bonding temperature, usually to a temperature of 200 to 250° C., preferably 210 to 240° C., thereby to complete the bonding. This step is called the "primary bonding step." The primary bonding may be affected either with or without applying a pressure. Finally, the film-heat-bonded metal sheet is quenched to a temperature at least 30° C. lower than the sticking temperature of the adhesive layer.

In a second method, the composite film is bonded to the metal sheet in one single step. That is, the composite film is bonded under pressure to the metal sheet, which has been previously heated to a temperature similar to that employed in the primary bonding step in the first method, followed by quenching the film-heat-bonded metal sheet.

The film-heat-bonded metal sheet of the present invention may be formed into containers as follows. First, the film-heat-bonded metal sheet is blanked into a desired shape, such as disc, ellipse, rectangular and square. The blank of the desired shape is subjected to drawing processing using a draw die and a punch thereby to obtain a shallow drawn article of a cup shape. The drawing processing may be carried out at a drawing ratio of from 1.1 to 3.0, preferably 1.2 to 2.8. The cup-shaped shallow drawn article may be used as a side seamless container.

A deep drawn container having a high ratio of wall height/bottom diameter can be obtained by drawing the cup-shaped shallow drawn article by using a redraw die of a small diameter and a redraw punch. If desired, the drawing may be repeated.

In the redrawing processing step, the shallow drawn cup can be ironed to some extent by adjusting the clearance between the draw die and the punch. The deeply drawn container can be further ironed by using an ironing draw die and an ironing punch.

Metal closures for a container may be formed from the film-heat-bonded metal sheet of the invention as follows. The film-heat-bonded metal sheet is blanked into a disc or another shape. The disc-shaped blank is formed into metal closures such as, for example, screw caps, vapor vacuum caps, anchor caps, phoenix caps, crown caps, pilfer-proof caps, peel-off caps, and can ends, which may be formed by conventional forming techniques such as, for example, drawing processing, press processing, bead processing, roll processing and score processing.

Illustrations of the containers formed from the film-heat-bonded adhered metal sheet are food cans, beverage cans, oil cans, confectionery cans, coffee cans, tea cans and other general cans and closures of these cans.

Some further representative embodiments of the film of the present invention are provided below.

As previously discussed, in certain preferred embodiments, the second layer (and/or another layer if present) contains an optional polymer dispersion irrespective of whether the first layer includes any such optional polymer dispersion. One such preferred alternative embodiment includes:

a first layer preferably having at least 25 wt. % and more preferably a majority by weight of amorphous polyester-based polymers (e.g., PET-G), a second layer having a majority by weight of one or more crystallizable polyester-based polymers (e.g., crystalline PET) and a plurality of non-polyester polymer domains (e.g. nylon), and one or more optional additional layers, if any.

In one such embodiment, the second layer further includes additive materials that provide a complimentary or synergistic enhancement in one or more area of performance. An example of such a further additive material is a metal salt such as, for example, cobalt neodecanoate.

A non-limiting example of an oxygen-scavenging embodiment of the film of the present invention is provided below. The below described film embodiment is suitable for use as a laminated film on steel or aluminum substrate, with the resulting laminated substrate being useful, for example, for forming cans, can ends, closures for jars and the like. The film is not only capable of protecting metal substrate of sealed packaging containers from contacting packaged product such as food or beverage product, but is also capable of rapidly depleting residual oxygen contained in the sealed packaging container, thereby increasing the shelf life of the packaged product (and in the case of packaged food or beverage products, improving the organoleptic or nutritional properties of the packaged product). The film exhibited the following surprising combination of beneficial properties: the oxygen-scavenging capacity of the film was suitably maintained during manufacture of the film and the subsequent lamination process; the oxygen-scavenging materials employed did not unsuitably disrupt the film casting and subsequent film stretching process of biaxial orientation; the oxygen-scavenging materials employed did not unsuitably affect desired coating properties such as good adhesion to metal substrate, good flexibility, good corrosion resistance, or other parameters specific to the coated article being produced (such as, e.g., ease of opening in the case of a beverage can end).

A three-layer biaxially oriented film structure was created by simultaneously co-extruding the combination of materials described in the below Table 1 and then stretching the cast film web 3.75 times in the linear direction followed by 3.75 times in the transverse direction such that the resultant film had a nominal thickness of 12 microns. The film was annealed in a tenter oven such that the resultant shrink measured on the film after testing at 300° F. for 30 minutes was less that 1% in both machine and transverse directions. The incorporation of the oxidizable polymer and catalyst into the film of Table 1 was achieved through the use of a pre-dispersion of these materials into a polyester carrier.

TABLE 1

| Layers | Layer Composition | Relative Amount of Each Layer Present in the Film |
| --- | --- | --- |
| Adhesive Layer | 33 wt. % PET | 20% |
| | 67% wt. % PETG | |
| Intermediate Layer | 82 wt. % PET | 60% |
| | 15 wt. % PETG | |
| | 2.7 wt. % MXD6 Polyamide | |
| | 0.3 wt. % Cobalt Salt | |
| Top Layer | 67 wt. % PET | 20% |
| | 32 wt. % PETG | |
| | 1 wt. % Wax Blend | |

The resultant multi-layer film was laminated to panels of aluminum having a gauge and surface treatment suitable for the manufacture of beverage can ends. A laboratory scale laminating unit supplied by LEDCO, Inc. was used to heat bond the film to the metal substrate at a heating roll temperature of 350° F., which is assumed to be the temperature of the film and metal surface at the point of lamination. The laminated panels were then baked in an electric oven set at 490° F. for 1 minute and then immediately submerged in cold water after removal from the oven. The panels were then converted into finished beverage can ends on a laboratory fabrication press.

To assess the oxygen-scavenging properties of the laminated film, the formed beverage can ends were sealed across the open end of four-ounce glass jars using epoxy glue. Prior to sealing, the glass jars were filled with water so that little or no headspace was present in the sealed jars. An oxygen measurement device supplied by Oxysense and known to the industry to be effective for this purpose was used to measure the scavenging of the oxygen within the water and head space in the jar. In order to do this, a calibrated fluorescent dot that varies in fluorescence with oxygen concentration was attached to the inside of the glass jars such that the depletion of oxygen could be tracked with time without any damage to the test container. Water in these jars contained between 8,000 and 9,000 parts per billion ("ppb") of oxygen due to natural solubility and small residual head space volume. The results of this test showed significant initial reduction in oxygen over the course of the first days of the test and then continued gradual reduction over the next weeks. Over the 112 days of the test, the beverage can ends consumed an average of 3,917 ppb of oxygen. These results for two such samples are presented below in Table 2.

TABLE 2

| Days | Sample 1 Oxygen Concentration (ppb) | Sample 2 Oxygen Concentration (ppb) |
| --- | --- | --- |
| 1 | 8255 | 8383 |
| 2 | 7379 | 6033 |
| 5 | 6343 | 5650 |
| 6 | 6028 | 5570 |
| 7 | 6202 | 5535 |
| 14 | 5963 | 5803 |
| 28 | 5421 | 4768 |
| 56 | 4640 | 4886 |
| 84 | 4671 | 4255 |
| 112 | 4362 | 4443 |

A number of embodiments of the invention have been described. Nevertheless, it will be understood that various modifications may be made without departing from the spirit and scope of the invention. Accordingly, other embodiments are within the scope of the following claims.

The complete disclosure of all patents, patent applications, and publications are incorporated herein by reference as if individually incorporated.

The invention claimed is:

1. An article, comprising: a metal sheet, and a biaxially oriented polymeric film heat-bonded to at least one major surface of the metal sheet, wherein the polymeric film comprises; a first layer adjacent the metal sheet comprising a mixture of one or more crystalline polyester resins and one or more amorphous polyester resins, wherein the one or more amorphous polyester reins is present within the first layer at a level of at least 25 weight percent, based on the weight of all the ingredients in the first layer; and a second layer comprising a majority by weight of one or more crystallizable polyester-based polymers.

2. The article of claim 1, wherein the film has either had a liquid wax coating applied thereto or comprises a third surface layer that includes a polyester having one or more wax materials blended therein.

3. The article of claim 1, wherein the polymeric film is used on a container closure and the film is firmly adhered on one side to the metal sheet and on the other side to a gasket material.

4. The article of claim 1, wherein the film has a glass transition temperature of at least 55° C. and a melting point of at least 220° C.

5. The article of claim 1, wherein the amorphous polyester comprises a copolyester based on esters of terephthalic acid and a blend of at least two different diols, wherein at least one of diols is known to reduce the crystallizability of terephthalic acid based polyesters.

6. The article of claim 1, wherein the amorphous polymer is an ester of terephthalic acid and one or more diols, wherein at least one diol comprises cyclohexane dimethanol and the cyclohexane dimethanol is present at a level of from 5 to 75% of the total moles of the diol blend.

7. The article of claim 1, wherein at least one of the first or second layers includes a plurality of metal flakes having an average aspect ratio in a range of 1.5:1 to 100:1.

8. The article of claim 1, wherein the first and second layers are in direct contact with each other.

9. The article of claim 1, wherein the polymeric film further comprises an oxygen-scavenging material, and wherein at least one of the first or second layers includes one or more metal catalysts in an amount of at least 6 parts per million (ppm) by weight metal.

10. The article of claim 9, wherein the oxygen-scavenging material comprises one or more oxygen-scavenging polyamide materials.

11. The article of claim 9, wherein the second layer includes a catalyst and at least about 5 weight percent of an oxygen-scavenging polyamide that is a reaction product of ingredients including m-xylylenediamine and a polycarboxylic acid.

12. The article of claim 9, wherein the oxygen-scavenging material comprises a catalyst and one or more polyester-based oligomers or polymers including an oxygen-scavenging group having an aliphatic or cycloaliphatic carbon-carbon double bond.

13. A food or beverage container, or a portion thereof, formed from the article of claim 1.

14. The food or beverage container of claim 13, wherein the food or beverage container, or a portion thereof, comprises an easy open can end.

15. The article of claim 1, wherein the first layer includes from 40 to 90 weight percent of the one or more amorphous polyester resins.

16. The article of claim 1, wherein the first layer includes from 50 to 80 weight percent of the one or more amorphous polyester resins.

17. The article of claim 7, wherein the metal flakes comprise aluminum flakes in a non-volatile carrier, wherein the aluminum metal flakes have an aspect ratio of from about 20:1 to about 80:1 and an average diameter in the range of about 0.1 microns to about 20 microns.

18. The article of claim 7, wherein the metal flakes comprise leafing aluminum flakes.

19. The article of claim 1, wherein the thickness of the first layer is in the range of about 5 to about 40% of the overall film thickness, the thickness of the second layer is in the range of about 20 to 95% of the overall film thickness, and the thickness of a optional surface layer, if present, is up to about 40% of the film overall thickness.

20. The article of claim 2, wherein the film has had a liquid wax coating applied thereto, the wax coating comprising an aqueous dispersion of a wax comprising carnauba, candelilla, lanolin, lanocerin, or mixtures thereof.

21. The article of claim 1, wherein the film has a final thickness in the range of 0.3 to 1.25 mils.

22. The article of claim 13, wherein the food or beverage container or portion thereof comprises a metal food or beverage can, and wherein the film is present as a coating on the interior of the food or beverage can.

23. The article of claim 22, wherein the amorphous polymer is an ester of terephthalic acid and one or more diols, wherein at least one diol comprises cyclohexane dimethanol and the cyclohexane dimethanol is present at a level of from 20 to 40% of the total moles of the diol blend.

24. The article of claim 22, wherein the food or beverage can comprises a drawn can.

25. The article of claim 24, wherein the drawn can is a deep drawn can.

26. The article of claim 24, wherein the thickness of the film is from about 15 to 50 microns.

27. The article of claim 22, wherein at least one of the first or second layers includes a plurality of metal flakes having an average diameter in the range of about 0.1 to about 20 microns.

28. The article of claim 27, wherein the metal flakes have an average aspect ratio in a range of 1.5:1 to 100:1.

29. The article of claim 27, wherein the metal flakes comprise leafing aluminum flakes.

30. The article of claim 22, wherein the ratio in thickness of the second layer to first layer is in the range of 1/0.05 to 1/5.

31. The article of claim 22, wherein the ratio in thickness of the second layer to first layer is in the range of 1/0.4 to 1/2.5.

32. The article of claim 1, wherein the films exhibit feathering below 0.1 inches.

* * * * *